US012146631B2

(12) United States Patent
Dressler et al.

(10) Patent No.: US 12,146,631 B2
(45) Date of Patent: Nov. 19, 2024

(54) HEADLIGHT FOR A MOTOR VEHICLE

(71) Applicant: HELLA GmbH & Co. KGaA, Lippstadt (DE)

(72) Inventors: Bjoern Dressler, Menden (DE); Ronny Letzin, Lippstadt (DE); Fabian Schueler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/519,585

(22) Filed: Nov. 27, 2023

(65) Prior Publication Data

US 2024/0093852 A1 Mar. 21, 2024

Related U.S. Application Data

(63) Continuation of application No. PCT/EP2022/061467, filed on Apr. 29, 2022.

(30) Foreign Application Priority Data

May 25, 2021 (DE) ..................... 10 2021 113 426.9

(51) Int. Cl.
*F21S 41/00* (2018.01)
*F21S 41/147* (2018.01)
(Continued)

(52) U.S. Cl.
CPC ........... *F21S 41/365* (2018.01); *F21S 41/147* (2018.01); *F21S 41/16* (2018.01); *F21S 41/255* (2018.01);
(Continued)

(58) Field of Classification Search
CPC . F21Y 2115/30; F21Y 2115/10; F21S 41/365; F21S 41/147; F21S 41/16; F21S 41/255
See application file for complete search history.

(56) References Cited

U.S. PATENT DOCUMENTS 7,726,859 B2 6/2010 Naganawa et al.
7,748,880 B2 7/2010 Kinoshita
(Continued)

FOREIGN PATENT DOCUMENTS

DE 102006033920 A1 2/2007
DE 102008015510 A1 10/2008
(Continued)

OTHER PUBLICATIONS

International Search Report dated Aug. 3, 2022 in corresponding application PCT/EP2022/061467.

*Primary Examiner* — Gerald J Sufleta, II
(74) *Attorney, Agent, or Firm* — Muncy, Geissler, Olds & Lowe, P.C.

(57) ABSTRACT

A headlight for a motor vehicle having at least one light source which emits light during operation of the headlight. A primary optical system has at least one light entry surface for the light emitted by the at least one light source and at least one light exit surface. A secondary optical system, which, during operation of the headlight, projects the light emitted from the at least one light exit surface of the primary optical system into the space outside the motor vehicle where it produces a light distribution which has a horizontal cut-off line and light portions located above the cut-off line in order to implement an OS function (overhead sign function). The headlight being designed such that a portion of the light emitted by the primary optical system is reflected back to the primary optical system by the secondary optical system.

15 Claims, 1 Drawing Sheet

(51) Int. Cl.

| | |
|---|---|
| ***F21S 41/16*** | (2018.01) |
| ***F21S 41/255*** | (2018.01) |
| ***F21S 41/365*** | (2018.01) |
| *F21W 102/155* | (2018.01) |
| *F21W 107/10* | (2018.01) |
| *F21Y 115/10* | (2016.01) |
| *F21Y 115/30* | (2016.01) |

(52) U.S. Cl.

CPC ... *F21W 2102/155* (2018.01); *F21W 2107/10* (2018.01); *F21Y 2115/10* (2016.08); *F21Y 2115/30* (2016.08)

(56) References Cited

U.S. PATENT DOCUMENTS

| | | | | |
|---|---|---|---|---|
| 8,348,486 | B2 | 1/2013 | Nakada | |
| 8,636,397 | B2 | 1/2014 | Kiesel | |
| 9,500,334 | B2 | 11/2016 | Iwasaki | |
| 9,631,786 | B2 | 4/2017 | Honda | |
| 9,732,925 | B2 * | 8/2017 | Fedosik | F21S 41/321 |
| 2005/0068787 | A1 * | 3/2005 | Ishida | F21S 41/151<br>362/538 |
| 2010/0284197 | A1 * | 11/2010 | Kiesel | F21S 41/275<br>362/509 |
| 2014/0169014 | A1 * | 6/2014 | Jungwirth | F21S 41/24<br>362/509 |
| 2019/0086050 | A1 * | 3/2019 | Dikau | F21S 41/322 |

FOREIGN PATENT DOCUMENTS

| | | | |
|---|---|---|---|
| DE | 102009020593 | A1 | 11/2010 |
| DE | 102010046021 | A1 | 3/2012 |
| DE | 102015202019 | A1 | 8/2015 |
| DE | 102016109132 | A1 | 11/2017 |
| EP | 2182271 | A1 | 5/2010 |
| EP | 2730836 | A1 | 5/2014 |
| EP | 2985522 | A1 | 2/2016 |
| JP | 2008177025 | A | 7/2008 |

* cited by examiner

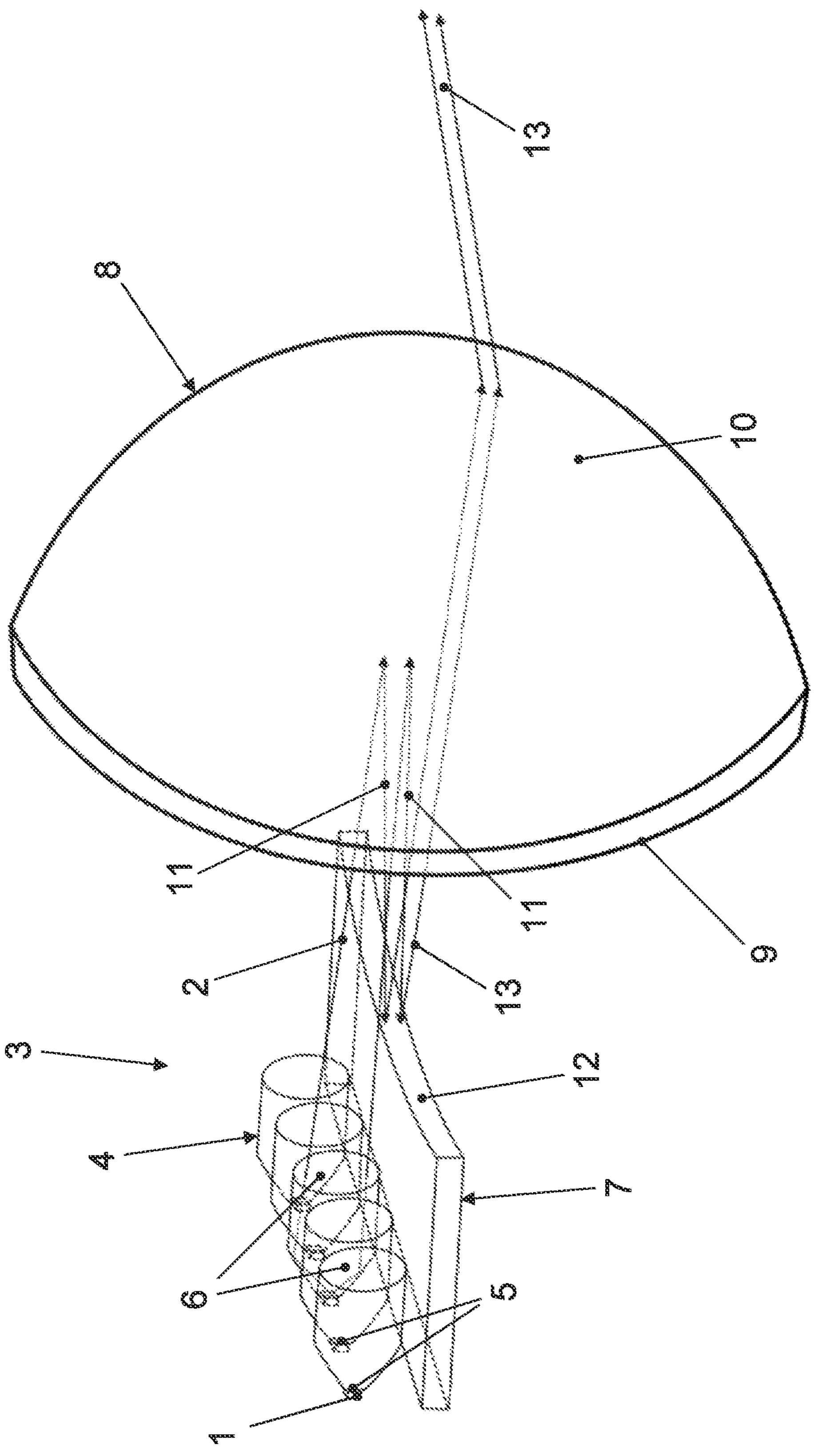
13
8
10
11
11
9
2
13
3
12
4
7
6
5
1

HEADLIGHT FOR A MOTOR VEHICLE

This nonprovisional application is a continuation of International Application No. PCT/EP2022/061467, which was filed on Apr. 29, 2022, and which claims priority to German Patent Application No. 10 2021 113 426.9, which was filed in Germany on May 25, 2021, and which are both herein incorporated by reference.

BACKGROUND OF THE INVENTION

Field of the Invention

The present invention relates to a headlight for a motor.

Description of the Background Art

Such a headlight must meet, among other things, the lighting requirements of the respective approval area, such as, for example, ECE or CCC or SAE. The photometry to be fulfilled also has so-called OS values (overhead sign values). These are measuring points that lie above the cut-off line of the light distribution.

A headlight is known from DE 10 2016 109 132 A1, which corresponds to US 2019/0086050, which is incorporated herein by reference. The headlight described therein comprises a number of first light sources, formed as light-emitting diodes, for a high beam and a low beam. The headlight further comprises a primary optical system which is formed of two light guides and into which the light emitted by the light-emitting diodes is coupled. The headlight further comprises a secondary optical system which is formed as a projection lens and can project the light emitted by the primary optical system into the space outside the motor vehicle. In this case, the light distribution generated by the headlight has a horizontal cut-off line and light components located above this cut-off line to implement an OS function (overhead sign function). To generate this OS function, a prism step is formed on a first light guide of the primary optical system, through which light emitted from the second light guide can enter the first light guide. This portion of the light entering the first light guide from the second light guide is deflected upward by the secondary optical system, so that it reaches a region above the cut-off line of the low beam.

It is to be regarded as disadvantageous in the conventional art that additional geometries on a primary optical system or on a projection lens signify increased production costs and can lead to increased susceptibility to defects. The increased susceptibility to defects can be caused, for example, by shape deviations in terms of functionality or by air inclusions or streaks or flow lines or the like in terms of optical quality.

A further headlight is known from DE 10 2009 020 593 A1, which corresponds to US 2010/0284197. In the headlight described therein, a secondary optical system designed as a plano-convex projection lens is provided, which has more than one hundred discretely distributed projections on its convex surface, which are used to implement an OS function. Geometries added to the projection lens usually have the major disadvantage that, in addition to the increased manufacturing effort and the possibly increased susceptibility to defects, they are visible when the headlight is viewed and therefore have a negative effect on the external appearance of the headlight.

A further headlight is known from EP 2 730 836 A1. In the headlight described therein, a metallic screen is provided between a primary optical system and a secondary optical system. The screen has reflective surfaces that are used to implement an OS function. The screen is an additional component that results in increased manufacturing, installation, and adjustment effort.

SUMMARY OF THE INVENTION

It is therefore an object of the present invention to provide a headlight, which can be produced more cost-effectively and/or enables the generation of OS values with simple means.

The headlight can be designed such that a portion of the light emitted by the primary optical system is reflected back to the primary optical system by the secondary optical system, and that said back-reflected portion of the light is reflected by the primary optical system in the direction of the secondary optical system and, after passing through the secondary optical system, is deflected into a region above the cut-off line in order to implement the OS function. With such a design, additional geometries on both the primary optical system and the secondary optical system can be dispensed with in order to implement the OS function. Furthermore, this results in a simplified manufacturability of the primary optical system and the secondary optical system. The manufacturing effort can be reduced, for example, by dispensing with additional mold inserts for introducing the additional geometries into the primary optical system or secondary optical system. Furthermore, defects caused by the additional geometries, such as air inclusions or streaks, for instance, can be avoided. An additional component such as a reflective screen or the like is also not required. This makes it possible to generate the OS values without changing a predefined design of the headlight.

A further advantage is the use of the light reflected back from the secondary optical system to generate the OS values. Without deliberate use, this back-reflected light would spread as disturbing scattered light in the headlight and possibly lead to undesirable effects such as, for example, light spots in the light distribution or glare or the like.

It can be provided that the primary optical system has a surface which faces the secondary optical system and is designed to reflect the portion of the light, reflected back from the secondary optical system, in the direction of the secondary optical system. In particular, the surface of the primary optical system, said surface facing the secondary optical system, can be oriented such that the normal to the surface forms an angle equal to 0° or not equal to 0° with the horizontal when the headlight is installed in the motor vehicle. For example, the surface of the primary optical system, said surface facing the secondary optical system, can be oriented such that the direction of propagation of the light portion, reflected by the surface in the direction of the secondary optical system, is inclined upwards and/or downwards relative to the horizontal when the headlight is installed in the motor vehicle. By tilting downwards, for example, this portion of the light can be deflected upwards by the secondary optical system during a projection so that it reaches a region above the cut-off line.

The surface of the primary optical system, the surface facing the secondary optical system, can be provided with a reflective coating. As a result, the reflectance of the surface of the primary optical system, said surface facing the secondary optical system, can be increased so that a larger proportion of the back-reflected light can be used to generate the OS values.

It can be provided that the surface of the primary optical system, the surface facing the secondary optical system, can be formed flat or curved and/or that the surface of the primary optical system, said surface facing the secondary optical system, is provided with a structure, such as, for example, a graininess or a graining. In particular, in the case of the curved design, the surface of the primary optical system, said surface facing the secondary optical system, can be concave or convexly curved. By an appropriate inclination and shaping of the surface of the primary optical system, said surface facing the secondary optical system, the back-reflected light can be shaped and reflected again in the direction of the secondary optical system so that the shaped and reflected light can be used to generate the desired OS values.

It is possible that the surface of the primary optical system, the surface facing the secondary optical system, can be part of the at least one light exit surface of the primary optical system or corresponds to the at least one light exit surface. Alternatively, it can be provided that the surface of the primary optical system, said surface facing the secondary optical system, is not part of the at least one light exit surface of the primary optical system and/or does not correspond to the at least one light exit surface. In this case, the surface of the primary optical system, said surface facing the secondary optical system, can, for example, be formed on a base, in particular on a base plate of the primary optical system.

The secondary optical system can have a light entry surface for the light emitted from the at least one light exit surface of the primary optical system and a light exit surface for the light entering through the light entry surface. In this case, the light entry surface of the secondary optical system can be designed to reflect the portion of the light, emitted by the primary optical system, back to the primary optical system.

The secondary optical system can be designed so that the portion of the light reflected by the surface of the primary optical system, said surface facing the secondary optical system, in the direction of the secondary optical system enters the secondary optical system through the light entry surface and then exits the secondary optical system through the light exit surface. The secondary optical system can thereby contribute to the implementation of the OS function without geometric modification.

The at least one light source can be designed as a light-emitting diode or laser diode, in particular wherein a plurality of light-emitting diodes and/or laser diodes serving as light sources are provided. In particular, the primary optical system can have a plurality of light entry surfaces, wherein at least one of the light sources is assigned to each of the light entry surfaces so that the light emitted by the light source enters the assigned light entry surface.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a schematic side view of a headlight of the invention with light beams drawn in by way of example.

DETAILED DESCRIPTION

The headlight shown comprises a plurality of light sources 1 which emit light 2 during operation of the headlight. Light sources 1 are designed as light-emitting diodes (LEDs). Alternatively, laser diodes can be used instead of the light-emitting diodes.

The headlight further comprises a primary optical system 3, which has a plurality of collimating optics 4, one of which is assigned to each of light sources 1. For light 2 of one of light sources 1, each of collimating optics 4 has a light entry surface 5 and a light exit surface 6. It is also possible that, for example, only one common light exit surface is provided for all collimating optics 4. Primary optical system 3 also has a base plate 7 on which collimating optics 4 are arranged.

The headlight further comprises a secondary optical system 8, which is designed as a single lens in the illustrated exemplary embodiment. The lens can be designed, for example, as a plano-convex lens. It is certainly possible to provide a more complex secondary optical system, for example, one formed of multiple components.

Secondary optical system 8, designed as a lens in the illustrated exemplary embodiment, has a light entry surface 9 for the light 2 emitted from the at least one light exit surface 6 of primary optical system 3 and a light exit surface 10 for the light entering through light entry surface 9.

During operation of the headlight, the light 2, emitted from the at least one light exit surface 6 of primary optical system 3, is projected by secondary optical system 8 into the space outside the motor vehicle so that a light distribution is generated there which has a horizontal cut-off line and light portions located above said cut-off line in order to implement an OS function.

To implement this OS function, a portion 11 of light 2 is used, which is reflected back from light entry surface 9 of secondary optical system 8. This portion 11 of light 2 strikes a surface 12 of primary optical system 3, said surface facing secondary optical system 8. This surface 12 is the front face of base plate 7 of primary optical system 3, which surface faces secondary optical system 8. A portion 13 of back-reflected portion 11 is again reflected from surface 12 in the direction of secondary optical system 8. This portion 13 enters secondary optical system 8 through light entry surface 9 and exits slightly upwards through light exit surface 10.

It is entirely possible to envisage using a different surface of primary optical system 3, instead of the front face of base plate 7, to reflect portion 11 reflected back by secondary optical system 8. For example, at least one surface on one or more of collimating optics 4 can be used. In particular, one or more of the light exit surfaces 6 of collimating optics 4 can also be used to reflect portion 11 of light 2 reflected back by secondary optical system 8.

Surface 12 of primary optical system 3, said surface provided for reflecting portion 11 of light 2 reflected back by secondary optical system 8, can be oriented such that the normal to surface 12 forms an angle equal to 0° or not equal to 0° with the horizontal when the headlight is installed in the motor vehicle. For example, surface 12 of primary optical system 3, said surface facing secondary optical system 8, can be oriented such that the direction of propagation of portion 13 of light 2, which portion is reflected by surface 12 in the direction of secondary optical system 8, is inclined downwards relative to the horizontal when the headlight is installed in the motor vehicle. As a result, this portion 13 of the light is deflected upwards as it passes through secondary optical system 8, so that it reaches a region above the cut-off line. Alternatively, surface 12 of primary optical system 3, said surface facing secondary optical system 8, can also be oriented such that the direction of propagation of portion 13 of light 2 reflected by surface 12 in the direction of secondary optical system 8 is inclined upwards relative to the horizontal when the headlight is installed in the motor vehicle.

It is possible that surface 12 of primary optical system 3, said surface provided for reflecting portion 11 of light 2 reflected back by secondary optical system 8, is provided with a reflective coating. This allows the reflectance of the surface of the primary optical system, said surface facing the secondary optical system, to be increased, so that a larger portion 13 of back-reflected light 2 can be used to generate the OS values.

In the illustrated exemplary embodiment, surface 12 of the primary optical system, provided for reflecting portion 11 of light 2 reflected back by secondary optical system 8, is concavely curved. Alternatively, surface 12 can also be formed flat or convexly curved. By suitably shaping surface 12, provided for reflecting portion 11 of light 2 reflected back by secondary optical system 8, portion 13 of light 2 can be suitably shaped, so that the shaped and reflected portion 13 of light 2 can be used to generate the desired OS values.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlight for a motor vehicle, the headlight comprising:

at least one light source that emits light during operation of the headlight;

a primary optical system that has at least one light entry surface for the light emitted by the at least one light source, and has at least one light exit surface; and a secondary optical system that, during operation of the headlight, projects the light emitted from the at least one light exit surface of the primary optical system into a space outside the motor vehicle where the light produces a light distribution which has a horizontal cut-off line and light portions located above the horizontal cut-off line in order to implement an OS function (overhead sign function), wherein a portion of the light emitted by the primary optical system is reflected back to the primary optical system by the secondary optical system, and wherein the back-reflected portion of the light is reflected by the primary optical system in a direction of the secondary optical system and, after passing through the secondary optical system, is deflected into a region above the cut-off line in order to implement the OS function.

2. The headlight according to claim 1, wherein a portion of the primary optical system that faces the secondary optical system is designed to reflect the portion of the light, reflected back from the secondary optical system, in the direction of the secondary optical system.

3. The headlight according to claim 2, wherein the portion of the primary optical system facing the secondary optical system is oriented such that a normal to the portion forms an angle equal to 0° or not equal to 0° with the horizontal when the headlight is installed in the motor vehicle.

4. The headlight according to claim 2, wherein the portion of the primary optical system facing the secondary optical system is oriented such that a direction of propagation of the portion of the light, reflected by the portion of the primary optical system in the direction of the secondary optical system, is inclined upwards and/or downwards relative to the horizontal when the headlight is installed in the motor vehicle.

5. The headlight according to claim 1, wherein the portion of the primary optical system facing the secondary optical system is provided with a reflective coating.

6. The headlight according to claim 1, wherein the portion of the primary optical system facing the secondary optical system is formed flat or curved and/or wherein the portion of the primary optical system facing the secondary optical system is provided with a structure, a graininess, or a graining.

7. The headlight according to claim 6, wherein the portion of the primary optical system facing the secondary optical system is concave or convexly curved.

8. The headlight according to claim 2, wherein the portion of the primary optical system facing the secondary optical system is part of the at least one light exit surface of the primary optical system or corresponds to the at least one light exit surface.

9. The headlight according to claim 2, wherein the portion of the primary optical system facing the secondary optical system is not part of the at least one light exit surface of the primary optical system and/or does not correspond to the at least one light exit surface.

10. The headlight according to claim 9, wherein the portion of the primary optical system facing the secondary optical system is a surface formed on a base or on a base plate of the primary optical system.

11. The headlight according to claim 2, wherein the secondary optical system has a light entry surface for the light emitted from the at least one light exit surface of the primary optical system and a light exit surface for the light entering through the light entry surface.

12. The headlight according to claim 11, wherein the light entry surface of the secondary optical system is designed to reflect the portion of the light, emitted by the primary optical system, back to the primary optical system.

13. The headlight according to claim 11, wherein the secondary optical system is designed so that the portion of the light reflected by the portion of the primary optical system facing the secondary optical system, in the direction of the secondary optical system, enters the secondary optical system through the light entry surface of the secondary optical system and then exits the secondary optical system through the light exit surface of the secondary optical system.

14. The headlight according to claim 1, wherein the at least one light source is one or more light-emitting diodes and/or one or more laser diodes.

15. The headlight according to claim 1, wherein the at least one light source includes a plurality of light sources and the at least one light entry surface of the primary optical system includes a plurality of light entry surfaces, wherein each respective one of the plurality of light sources is assigned to a respective one of the plurality of light entry surfaces so that the light emitted by each of the plurality of light sources enters each of the plurality of light entry surfaces, respectively.

* * * * *